INVENTORS:
CARL MARTIN
WILLIAM C. PARKER

United States Patent Office 3,559,059
Patented Jan. 26, 1971

3,559,059
FORCE INDICATING SYSTEM
Carl Martin and William C. Parker, Dallas, Tex., assignors to Space Corporation, Dallas, Tex., a corporation of Texas
Filed July 12, 1968, Ser. No. 776,288
(Filed under Rule (47)a and 35 U.S.C. 116)
Int. Cl. G01r 17/06, 1/38
U.S. Cl. 324—99
7 Claims

ABSTRACT OF THE DISCLOSURE

Analog and digital representations of forces applied to a load cell are produced by a system that includes a compensated resistance bridge. Analog representations of the applied forces are produced almost instantaneously by coupling an indicator directly to the output terminals of the load cell. This representation is independent of the digital representation which may not be available for several seconds after the application of a force or a changing applied force. The digital representation is produced by the action of a servo loop and a variable resistor in one arm of the resistance bridge. A compensating network connected across opposed nodes of the resistance bridge linearizes the digital readout to produce a single scale reading for all values of force applied to the load cell.

BACKGROUND OF THE INVENTION

This invention relates generally to a force measuring system for providing both an analog and digital representation of the measured force, and more particularly to a force measuring system providing both an analog and digital readout wherein the digital representation is linearized over the complete range of values of applied force.

It has previously been recognized that a servo operated digital readout provides greater accuracy in force measurement than analog readout devices. Unfortunately, the time delay between the application of a force and a digital readout is in many cases too long and cannot be tolerated. To minimize this problem, an analog indicator was coupled to the servo loop to provide a faster initial force indication. Such analog indicators are not independent of the digital readout but rather a part of the servo mechanism system. As a result, there is also a time delay between the application of a force to a load cell and the analog indication.

Another problem encountered with digital readout systems was that only a small range of the load cell output was usable to insure a reasonable degree of accuracy. Thus, for applications where a wide range of forces are to be measured, a different load cell had to be employed for each range of values. One attempt to eliminate the need for multiple load cells included the use of resistors in the measuring circuit to characterize the ouput of the load cell to a particular digital readout. However, this provided only partial correction and multiple load cells were required for applications where measured forces varied over a wide range. In such systems, the readout device was calibrated for full scale from each load cell. Thus, an operator had to continuously determine the multiplication factor for the displayed reading before the true magnitude of an applied force could be determined.

In accordance with the present invention, both analog and digital representations are displayed by a system wherein the analog representation is produced almost instantaneously and the digital representation is linearized to produce an accurate single scale display from one load cell. The subsystem for producing the analog representation is essentially independent of the subsystem for producing the digital representations. Since the analog subsystem is independent of the digital subsystem, no time will be lost waiting for a servo mechanism to stabilize, and the operator has available almost instantaneously a close approximation of the force applied to a measuring load cell. The digital subsystem includes a resistance bridge with a plurality of calibrating or span resistors connected across opposite nodes thereof. These calibrating resistors are switched in and out individually as the applied force increases or decreases from one range of values to another. This permits a single range readout device to be employed over the entire range of applied forces.

Both the analog and digital readouts may be calibrated for direct measurement of compression or tension forces in units such as pounds, tons, kilograms, p.s.i., etc., when used with appropriate strain gauge devices (load cells). Typical applications include jet engine or missile thrust measurement, tank (chemical batch) weighing, aircraft weighing or measurement of any force or pressure that can be sensed by a strain gauge device.

An object of the present invention is to provide an improved force measurement system for producing an analog force representation and a digital force representation independently of each other. Another object of this invention is to provide an improved force measuring system for producing an almost instantaneous analog representation and a single range digital representation for a wide range of applied forces. A further object of this invention is to provide an improved force measuring system for producing a single range digital readout from a single set of load cells. A still further object of this invention is to provide an improved force measuring system wherein the differences between the characteristics of a force measuring means and a digital readout are compensated to provide a linearized single range digital representation.

SUMMARY OF THE INVENTION

This invention provides an improved force measuring system which includes a force responsive means for generating electrical signals proportional to the magnitude of a force applied thereto. These electrical signals are coupled to a first subsystem for providing a single scale digital readout representative of the range of measured forces. In addition, the generated electrical signals are coupled to a second subsystem for producing analog indications representative of the applied forces, independently of the digital readout subsystem.

A more complete understanding of the invention and its advantages will be apparent from the specification and claims and from the accompanying drawings illustrative of the invention.

DESCRIPTION OF THE PREFERRED EMBODIMENT

Figure 1:
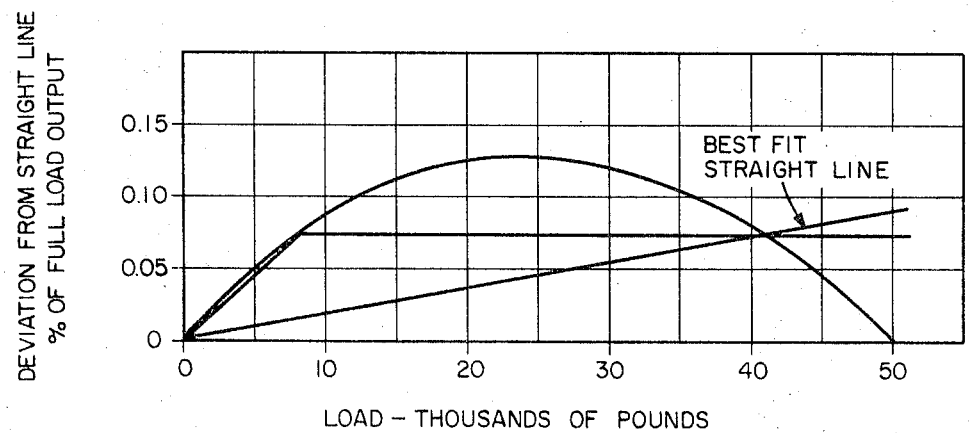
FIG. 1 is a plot of the output of a typical load cell in percent of full load output versus applied load in thousands of pounds.
Figure 2:
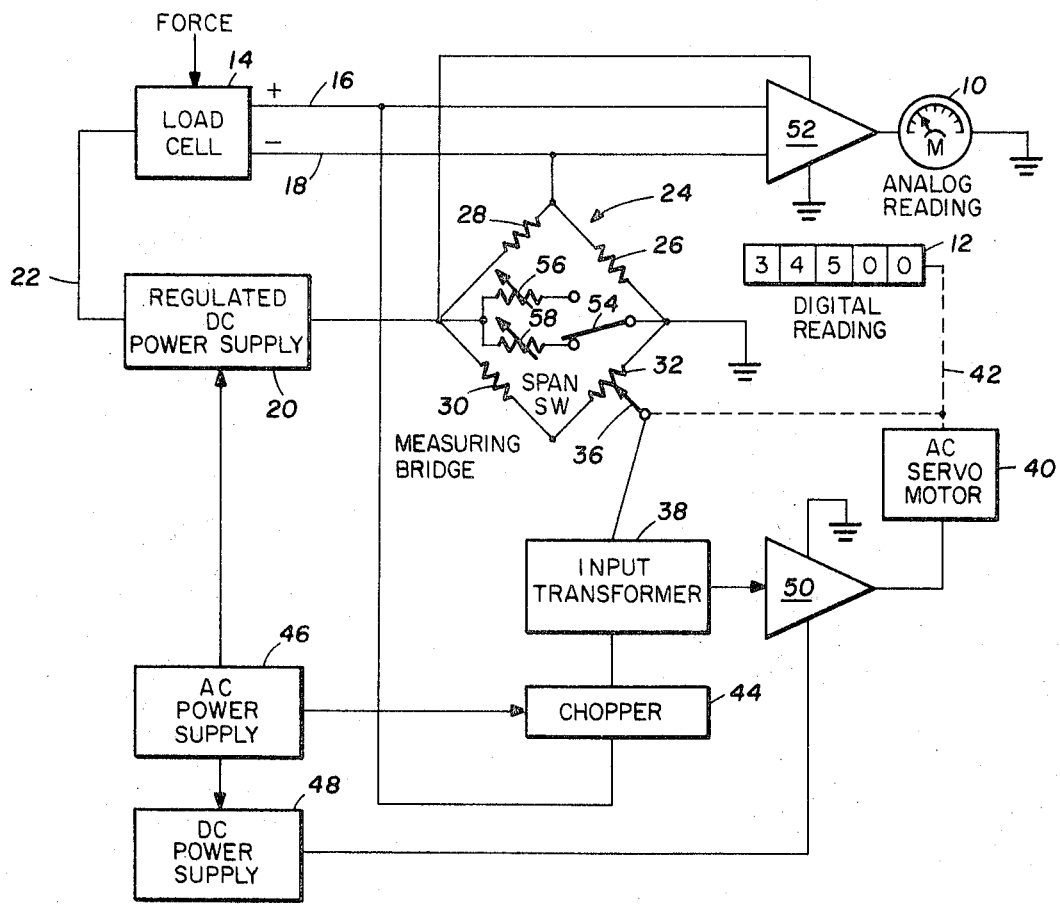
FIG. 2 is a block diagram of a dual representation force measuring system in accordance with the present invention.

Referring to FIGS. 1 and 2, there is shown a load cell force measuring system for producing an analog representation of a measured force at an indicator 10 and a digital representation at a digital counter 12. A load cell 14, or any one of many well known such devices may be used, responds to applied forces and produces electrical signals on lines 16 and 18. A typical load cell includes an array of strain gauges arranged in a bridge network. For the load cell 14, this bridge will be excited by a D.C. voltage from a regulated power supply 20 by means of a line 22.

As illustrated in FIG. 1, the output of a strain gauge load cell deviates from a straight line over its range of operation. The plot of FIG. 1 illustrates the deviation in percent of full load for a load cell having a range of 50,000 pounds. Such cells are usually calibrated to have a zero deviation at the two end points; resulting in a maximum deviation at the mid range value. Heretofore, in order to provide an accurate indication of applied forces, measuring systems have employed only the lower range values to minimize errors caused by the output deviation from a straight line. Thus, as many as three or four independent sets of load cells may be required. In accordance with the present invention, the load cell 14 may be used for its entire range capability.

To provide an accurate digital representation of forces applied to the load cell 14, over the entire operating range thereof, a measuring bridge 24 is connected to the line 18. The measuring bridge 24 includes fixed resistor arms 26, 28 and 30, and a variable resistor arm 32. This bridge is excited by a D.C. voltage from the regulated power supply 20.

In the system illustrated, the variable resistor 32 comprises a potentiometer having a wiper arm 36 electrically connected to one terminal of an input transformer 38, and mechanically coupled to the output shaft of a servo motor 40 by means of a linkage 42. Also coupled to the output shaft of the servo motor 40 is the digital counter 12.

The line 16 from the load cell 14 connects to one input terminal of a chopper 44 having a second input terminal connected to the second input terminal of the transformer 38 and excited from an A.C. power supply 46. The power supply 46 also provides energy for the regulated power supply 20 and a D.C. power supply 48. A voltage generated by the power supply 48 biases the amplifier stages of a servo amplifier 50 which receives an input signal from the transformer 38. The input signal to the amplifier 50 is amplified and applied to the servo motor 40 which drives until the wiper arm 36 reaches a point such that the transformer current drops to zero.

In addition to the digital subsystem, an analog subsystem also connects to the load cell 14 through the lines 16 and 18. Connected directly to the load cell output is a D.C. amplifier 52 having several stages of amplification biased from the regulated power supply 20. The output of the amplifier 52 produces a readout directly in units of force on the indicator 10. Because the analog subsystem is intended to provide an instantaneous indication of the force applied to the cell 14, the accuracy of the indicator 10 may be as poor as 1%.

In operation of the system illustrated in FIG. 2, the analog subsystem operates in a straight forward manner and produces an instantaneous representation of the magnitude of the forces applied to the load cell 14. For the digital subsystem, assume a given force applied to the load cell 14 and the servo motor 40 locked in place by operation of the amplifier 50. A change in the force applied to the cell 14 will cause an unbalance in the measuring bridge 24, thereby establishing a current flow in the windings of the input transformer 38. This current produces an input signal to the amplifier 50 which activates the servo motor 40 to reposition the wiper arm 36 of the variable resistor 32. The servo motor 40 continues to drive until the measuring bridge 24 is again electrically balanced (a null condition) and the transformer current drops to zero. This action causes the phase sensing servo motor armature to be again locked in place. Since the motor 40 also couples to the gears of the digital counter 12, a change in force representation will be made in the display.

When the force applied to the load cell 14 passes a preset limit, a span switch 54 is changed from a first position to a second position. This causes a change in the excitation voltage across the measuring bridge 24 by switching between span potentiometers 56 and 58. Use of the span potentiometers causes a linearization of the signal applied to the transformer 38 such that the deviation error follows the straight line curve of FIG. 1. Operation of the span switch 54 can be accomplished by a manual toggle, a rotary switch, or by preset cam-operated limit switches actuated by the servo motor 40. By means of a plurality of span potentiometers, a single scale digital clock 12 may be employed with one load cell to provide accurate force representations in digital form over the operating range of the load cell. Increased accuracy may be accomplished by providing additional span potentiometers. These potentiometers, in effect, vary the amount of adjustment required to the variable resistor 32 to equalize the inputs to the transformer 38.

Figure 3A:
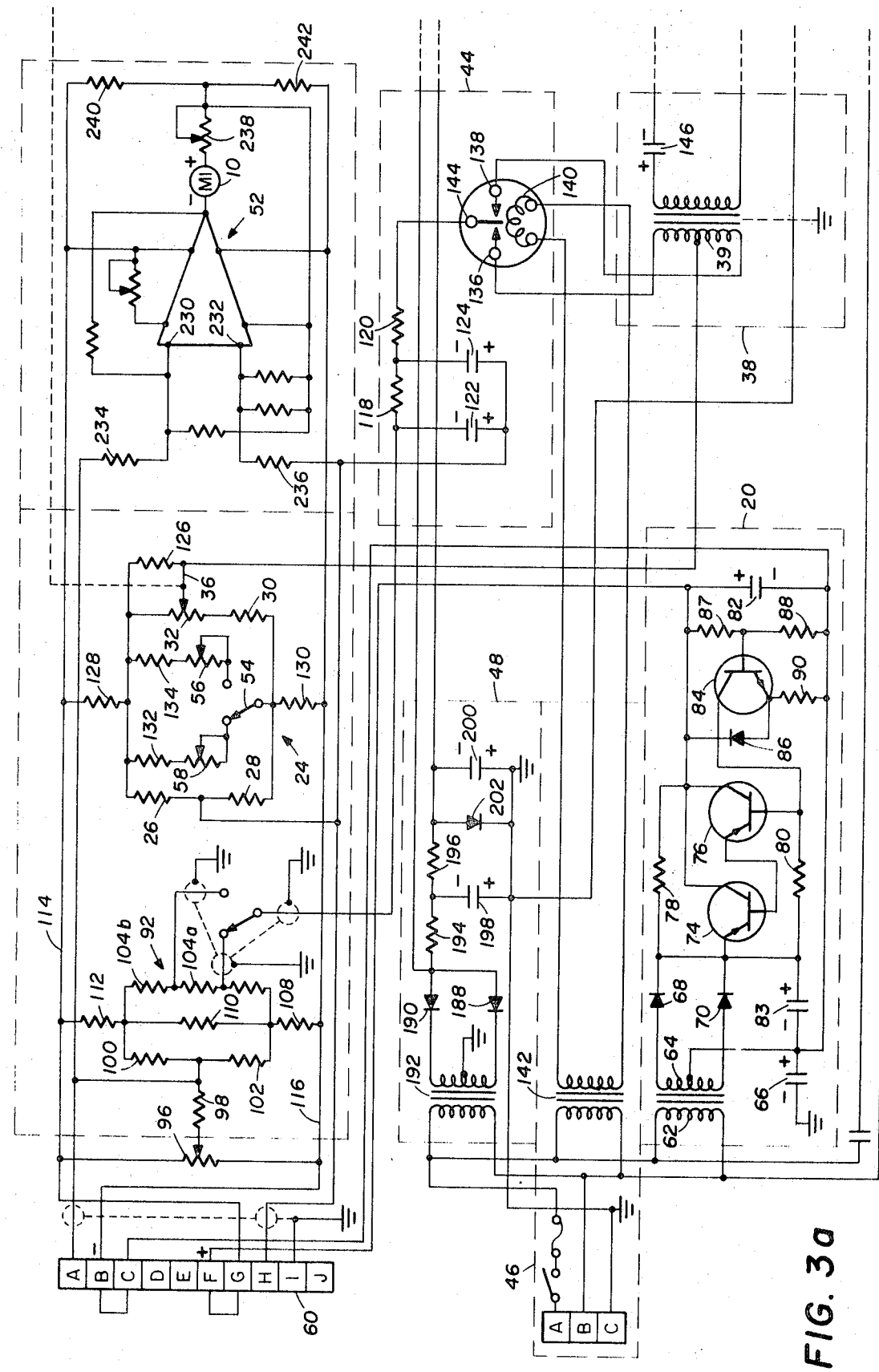
FIGS. 3a and 3b are an electrical schematic of the force measuring system of FIG. 2.
Figure 3B:
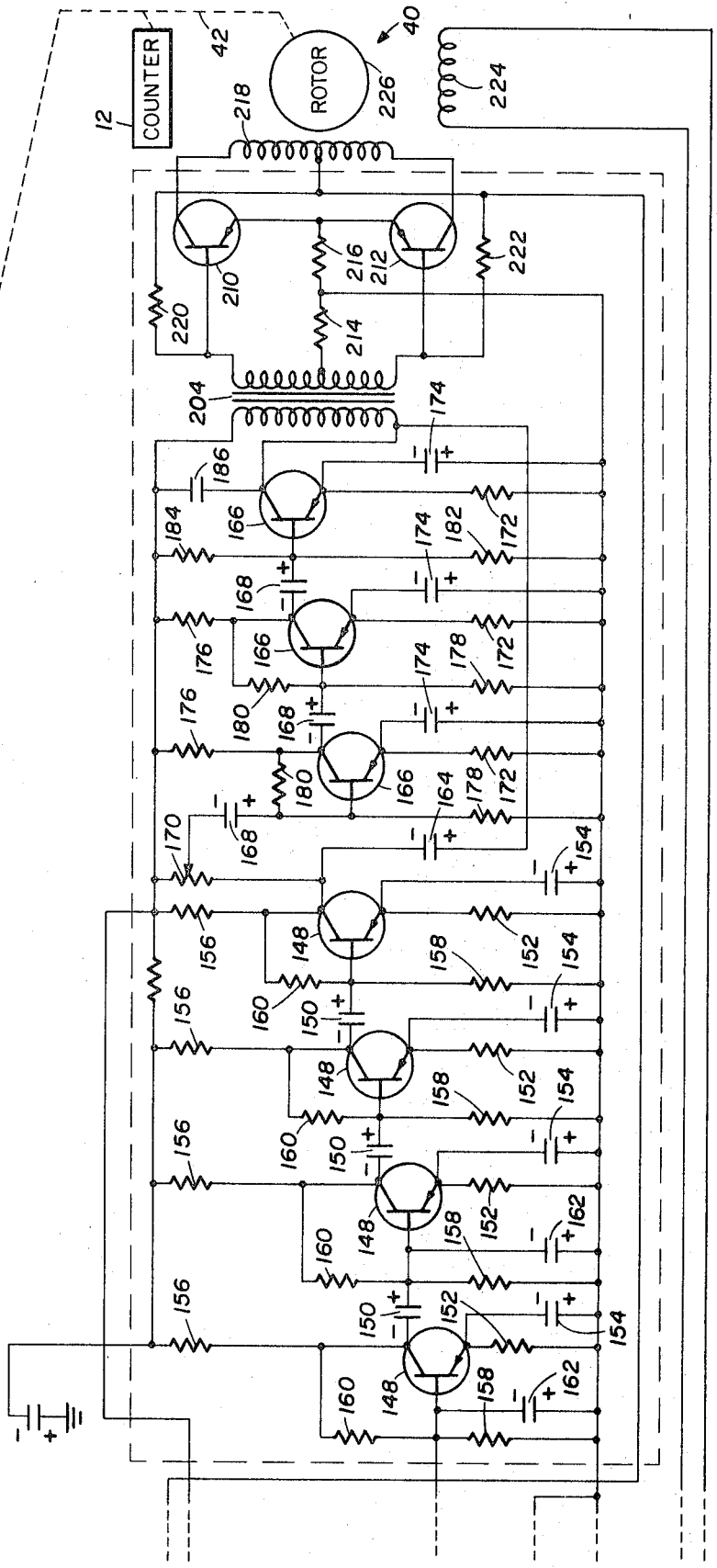

Referring to FIG. 3, there is shown an electrical schematic of the system of FIG. 2 exclusive of the load cell 14 which connects to terminals A and H of a terminal board 60. The strain gauge bridge of the load cell 14 is excited through terminals C and F by the regulated power supply 20 which consists of two stages of voltage regulation. An A.C. voltage from the power supply 46 energizes the primary winding of a transformer 62 that includes a center-tapped secondary winding 64. The center tap of the winding 64 connects to terminal C of the board 60 and to ground through a capacitor 66. A full wave rectifier including diodes 68 and 70 converts the A.C. voltage of the secondary winding 64 to a D.C. voltage at a terminal 72. This voltage is filtered by means of a resistor 78 and a capacitor 82 and is then supplied to terminal F of the board 60.

To precision regulate the voltage from the power supply 20 there is provided a two stage regulator consisting of transistors 74, 76 and 84 along with a diode 86. A voltage divider network including resistors 87 and 88 provides a base drive for the transistor 84 which is proportional to the output voltage of the regulator 20. Transistor 84 in turn controls the base drive for the transistor 76 by regulating the current flow through a resistor 80 and a resistor 90. Operation of the transistor 76 controls the current flow through the transistor 74 which shunts the resistor 78, thereby providing precision voltage regulation for the voltage appearing at terminals C and F of the board 60.

The precision regulated D.C. voltage at terminals C and F is also applied to terminals B and G, thereby providing the energizing voltage for the measuring bridge 24 and the D.C. operational amplifier 52. In addition, the output of the regulator 20 energizes a calibrating bridge circuit 92 that is in series with terminal A and the input to the chopper 44. This calibrating circuit includes a potentiometer 96 that adjusts the load cell to reference zero. The wiper arm of the potentiometer 96 connects through a resistor 98 to one node of a resistance bridge consisting of bridge resistors 100, 102, 103, 104a and 104b. Resistors 104a and 104b comprise one arm of the bridge and are used for the initial check of the circuit operation. During normal operation, the chopper 44 essentially connects directly to the load cell 14 by positioning a switch 106 as shown. The energizing voltage for the calibrating bridge 92 is determined by a series arrangement of resistors 108, 110 and 112 connected between lines 114 and 116.

The load cell output terminal tied to terminal H of the board 60 connects to one node of the measuring bridge 24 and to a filtering network consisting of resistors 118, 120, and capacitors 122 and 124. The filter network removes unwanted noise and extraneous A.C. signals from the line coupled to the chopper 44.

At the measuring bridge 24, terminal H connects to the junction of resistors 26 and 28. As explained, the measuring bridge 24 also includes a resistor 30 and a variable resistor 32. The variable resistor 32 includes the wiper arm 36 electrically connected to a shunting resistor 126 and the center tap of a primary winding 39 of an input transformer 38. Resistors 128 and 130 connected to lines 114 and 116, respectively, provide a circuit for excitation of the measuring bridge 24. In the embodiment shown in FIG. 3, the span switch 54 is a single-pole double-throw switch for changing from a "low" to a "high" range of measured forces. In the "low" range position, the potentiometer 58, in series with a resistor 132, establishes the excitation voltage of the measuring bridge in conjunction with resistors 128 and 130. In the "high" range position, the potentiometer 56, in series with a resistor 134, establishes a second excitation voltage for the measuring bridge. Typically, the "low" range includes forces from 0 to 6,000 p.s.i., and the "high" range includes forces from 6,000 p.s.i. to 60,000 p.s.i.

Connected to the end terminals of the primary winding 39 are the two fixed contacts, 136 and 138, of the chopper 44. The chopper 44 is a standard mechanical type including a coil 140 coupled to the secondary winding of a transformer 142 in the power supply 46. An oscillating contact 144 connects to the load cell 14 through the calibrating bridge 92. Energization of the coil 142 causes the contact 144 to oscillate between the fixed contacts 136 and 138. This produces a current flow through one-half the primary winding 39 during a first half cycle of the voltage energizing the coil 140, and a current flow through the opposite half of the primary winding through the second half cycle of the energizing voltage. An alternating voltage is thus produced in the secondary winding of the transformer 38 when the measuring bridge 24 is unbalanced as a result of a force exerted on the load cell 14.

This alternating voltage is coupled to the amplifier 50 through a coupling capacitor 146. The first four amplification stages of the amplifier 50 are similar; each including a transistor 148 coupled to the following stage through a capacitor 150. Each succeeding stage provides additional amplification to the alternating signal at the secondary winding of the transformer 38. Each of these four stages includes an emitter biasing circuit consisting of a resistor 152 in parallel with a capacitor 154, both tied to ground. The required collector voltage is established by a collector resistor 156, and the base bias established by a voltage divider including resistors 158 and 160. The first two stages also include a capacitor 162 in the base bias circuit.

Stages five through seven of the amplifier 50 are similar to the first four stages; however, a feedback circuit including a capacitor 164 connects the output of the seventh stage to the input of the fifth stage. This feedback circuit provides for stable operation of the amplifier. Each of the last three stages of the amplifier 50 includes a transistor 166 coupled to the preceding stage by means of a capacitor 168. The capacitor 168 connected to the base electrode of the first stage is tied to the wiper arm of a potentiometer 170 which connects to the collector electrode of the collector electrode of the fourth stage and the feedback capacitor 164. Biasing circuits including a resistor 172 and a capacitor 174, both connected to ground, establishes the emitter bias voltage for each of the transistors 166. The collector bias voltage for the fifth and sixth stages of the amplifier 50 is established by resistors 176. Voltage dividing networks including resistors 178 and 180 determine the base bias voltage for stages five and six. The seventh stage of the amplifier 50 has a base bias established by means of resistors 182 and 184. The collector electrode of the seventh stage is connected to the D.C. power supply 48 through a capacitor 186.

The power supply 48 comprises a simple voltage regulator that includes a full wave rectifier consisting of diodes 188 and 190 connected to the secondary of a transformer 192. Two voltage levels are generated by the power supply 48, one unfiltered and the other regulated and filtered. The regulator includes resistors 194 and 196, capacitors 198 and 200, and a diode 202. A voltage established across the diode 202 is the bias energy for the seven stages of amplification previously described. The unregulated voltage produced by the supply 48 biases the drive circuit of the amplifier 50 as will be explained shortly.

In the drive circuit, an output transformer 204 has a primary winding 206 connected to the regulated voltage of the supply 48 and the collector electrode of the seventh amplification stage of the amplifier 50. The center tap of a secondary winding 208 of the transformer 204 connects to the emitter electrodes of transistors 210 and 212, arranged in a push-pull configuration, through resistors 214 and 216. The end terminals of the secondary 208 are respectively connected to the base electrodes of the transistors 210 and 212. In addition, the end terminals are interconnected to the center tap of a motor winding 218 through resistors 220 and 222.

The motor winding 218 is part of the servo motor 40 which also includes a motor winding 224. Typically, the servo motor 40 is a two-phase motor of the type sold of Diehl Manufacturing Company of Somerville. N.J. The armature 226 of this motor is mechanically coupled to the wiper arm 36 and the digital counter 12 by means of a mechanical linkage 42. There are many counters available that may be used with the system described. To complete the digital subsystem, the end terminals of the motor winding 218 are individually connected to the collector electrodes of the transistors 210 and 212.

In operation, when current flows through the primary voltage difference exists between the winding 39 as a result of an unbalance in the measuring bridge 24, an input signal is produced at the first stage of the amplifier 50. After amplification, this signal turns on either transistor 210 or 212, depending on the polarity of the input signal, and the armature 226 drives the digital counter 12 and the wiper arm 36 through the linkage 42. Adjusting the wiper arm 36 rebalances the measuring bridge 24, thereby cutting off the current flow through the transformer 38. This cuts off the input signal to the amplifier 50 and de-energizes the winding 218, thereby locking the rotor 226 in a fixed position and establishing a new digital representation.

To provide an instantaneous analog representation of the force applied to the load cell 14, the D.C. operational amplifier 52 has two input terminals 230 and 232 respectively connected to terminal J and terminal H of the board 60. Input resistors 234 and 236 are included in the lines between the terminal board and the input terminals of the operational amplifier 52. In the usual manner, this amplifier produces milliamp output from a millivolt input at the terminals 230 and 232. This milliamp output signal passes through the indicator 10 to give a direct representation in force units proportional to the signal developed by the load cell 14. A potentiometer 238 in series with the meter 10 and connected to the junction of resistors 240 and 242 provides a means for calibrating the reading displayed by the meter 10.

While only one embodiment of the invention, together with modifications thereof, has been described in detail herein and shown in the accompanying drawings, it will be evident that various further modifications are possible in the arrangement and construction of its components without departing from the scope of the invention.

What is claimed is:

1. In a system for measuring the magnitude of electrical signals generated by load cells in response to applied forces, the combination comprising:
   load cell means, bridge means for generating a signal, servo means responsive to an electrical signal representative of the difference between the output of the load cell and the output of the bridge means for electrically adjusting said bridge, digital indicator means coupled to said servo means to provide a single scale readout representative of the magnitude of forces applied to the load cells, compensating means connected across the bridge having a plurality of positions for varying the electrical characteristics of said bridge means to match the output characteristics thereof with those of the force responsive load cells, each position matching a selected portion of the range of the applied forces, and analog means directly responsive to the electrical signals produced by the load cells to provide a single scale analog representation of the magnitude of the applied forces over a complete range of values independent of said measuring bridge means.

2. The combination of claim 1 wherein said compensating means comprises:

a plurality of calibrating resistors having a common connection to one node of said bridge means, and switching means connected to an opposite node of said bridge means for individually switching said calibrating resistors into the bridge circuit for linearizing said indicator means over selected portions of the range of applied forces.

3. The combination of claim 1 wherein said servo responsive means includes:

a chopper for converting a D.C. electrical signal representative of the difference between the output of the load cell and the output of the bridge means into an alternating current signal, an amplifier responsive to the alternating current signal for providing an output error signal, and a servo motor responsive to the error signal for readjusting said bridge means.

4. A force measuring system comprising:

load cell means responsive to applied forces for producing electrical signals proportional thereto, indicator means directly responsive to the electrical signals of said load cell means for providing an analog indication of the magnitude of the applied forces independent of any other output of the system, a resistance bridge having at least one arm including a variable resistor, means for adjusting said variable resistor in response to a signal representative of the difference between the output of the load cell and the output of the bridge, readout means coupled to said adjusting means to provide a digital indication proportional to the magnitude of forces applied to said load cell means, and a plurality of calibrating resistors each selectively connectable across said resistance bridge for linearizing said system over selected portions of the force range of said load cell means.

5. A force measuring system comprising:

force responsive means for generating electrical signals proportional to the magnitude of an applied force, a resistance bridge having a bridge arm with a variable resistance, servo means responsive to a difference electrical signal from said force responsive means and said bridge for adjusting the variable resistance of said resistance bridge, a digital indicator coupled to said servo means and operable in conjunction therewith for displaying a digital readout representative of applied forces, selectively operable means connected across said resistance bridge for linearizing the digital readout over selected portions of the total range of the system, and means directly responsive to the electrical signals from said force responsive means for providing an analog indication representative of the applied force independently of the digital readout of said digital indicator.

6. The system of claim 5 wherein said selectively operable means includes:

a plurality of calibrating resistors each commonly connected to a node of said resistance bridge, and switching means connected at an opposite node of said resistance bridge for switching one of said calibrating resistors into said bridge circuit for linearizing the digital readout over selective portions of the total range of the applied forces.

7. The system of claim 5 wherein said servo means comprises:

means for converting the electrical signal from said resistance bridge to an alternating current signal, means for amplifying said alternating current signal, and a servo motor connected to the output of said amplifying means and mechanically coupled to said variable resistor to balance said resistance bridge.

References Cited
UNITED STATES PATENTS

| | | | |
|---|---|---|---|
| 2,880,393 | 3/1959 | Cornish | 324—115X |
| 3,100,546 | 8/1963 | Cramwinckel | 324—99X |
| 3,281,685 | 10/1966 | Talbot, Jr. | 324—99 |
| 3,399,349 | 8/1968 | Davis | 324—115 |
| 3,421,083 | 1/1969 | Bosworth et al. | 324—99 |

RUDOLPH V. ROLINEC, Primary Examiner

E. F. KARLSEN, Assistant Examiner

U.S. Cl. X.R.

73—88.5; 177—211; 324—115